United States Patent [19]
Walter et al.

[11] 4,424,437
[45] Jan. 3, 1984

[54] HAIR DRYER WITH REMOTE SENSING TEMPERATURE CONTROL

[75] Inventors: Henry J. Walter, Dunedin, Fla.; Frank Schwarz, Stamford, Conn.

[73] Assignee: Clairol Incorporated, New York, N.Y.

[21] Appl. No.: 238,240

[22] Filed: Feb. 24, 1981

[51] Int. Cl.³ .............................................. H05B 1/02
[52] U.S. Cl. ................................... 219/364; 219/370; 34/48; 34/90
[58] Field of Search ............... 219/364, 370, 369; 502, 219/358, 359; 34/96, 97, 98, 99, 100; 132/7, 9, 11 R; 236/DIG. 15

[56] References Cited
U.S. PATENT DOCUMENTS

| 2,914,647 | 11/1959 | Ganske et al. | 219/358 |
| 3,821,516 | 6/1974 | Hayes et al. | 219/364 |
| 4,002,175 | 1/1977 | Brainard et al. | 128/399 |
| 4,167,820 | 9/1979 | de Groot | 219/364 |
| 4,258,731 | 3/1981 | Tsujimoto et al. | 132/9 |
| 4,259,566 | 3/1981 | Kobayashi | 219/358 |
| 4,260,875 | 4/1981 | Walter et al. | 219/364 |

OTHER PUBLICATIONS

Wahl, Catalog #W101D, Revision A, (1980).
Wahl, Short Form Catalog W1106D, Revision A, (1980).

Primary Examiner—Roy N. Envall, Jr.
Assistant Examiner—M. M. Lateef
Attorney, Agent, or Firm—Isaac Jarkovsky; John J. Balser; Gerald S. Rosen

[57] ABSTRACT

An electric hair dryer having a radiometer which remotely senses the infrared radiation emanating from the hair being dried and which contains a control means that causes the heating means in the dryer to turn off when the infrared radiation indicates the temperature of the hair is about 50° C.

10 Claims, 1 Drawing Figure

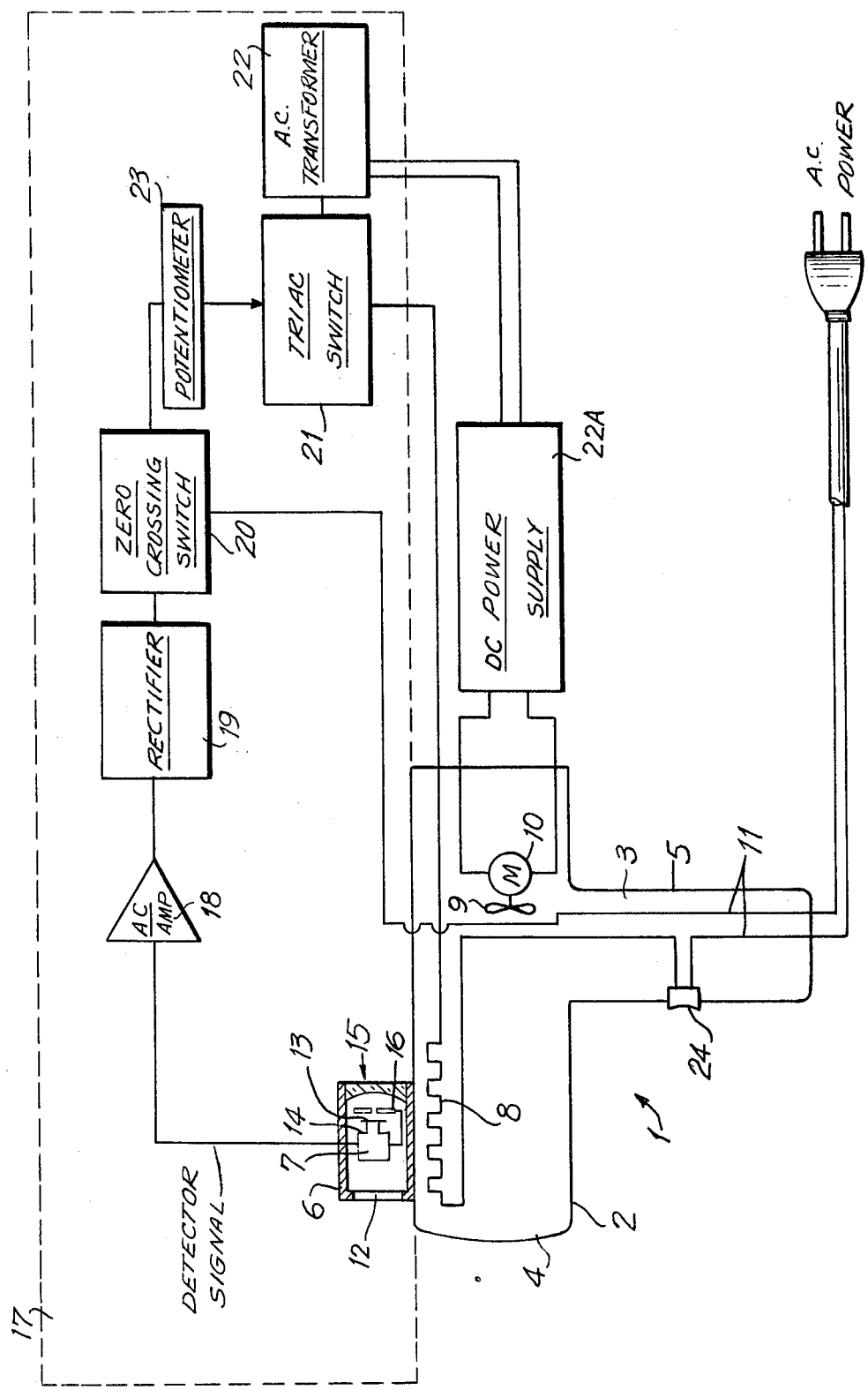

HAIR DRYER WITH REMOTE SENSING TEMPERATURE CONTROL

DESCRIPTION

Background

This invention relates to electric hair dryers comprised of a housing having an air inlet and an air outlet, and containing therein a fan, fan motor and heating element, said hair dryer having a means to control the heat output of the heating element and thus the temperature of the outgoing airstream.

More particularly, this invention relates to an electric hair dryer having an infrared radiation sensor which senses the infrared radiation from the hair and thus its temperature. The infrared radiation sensor which can be mounted either externally on the housing or internally within the housing has means which automatically control the heat output of the heating element in response to the temperature of the hair and/or scalp.

Hair drying is an evaporative process accelerated by heat. In order to dry the wet hair, sufficient heat energy must be applied to the hair to heat the hair fibers, overcome the heat of sorption of the water in the hair and vaporize the water on the hair. The heat is carried to the hair by a heated airstream. Therefore, the rate of drying is proportional to the temperature of the hair, i.e., the higher the temperature, the faster the hair will be dried. When hair is wet, it absorbs the heat of the dryer air stream and shields the scalp. As it dries, water evaporates, the temperature of the hair increases and some of the heated air reaches the scalp.

It is thus desirable to design a hair dryer which has automatic means to adjust the temperature of the airstream to permit rapid drying and also to avoid both overheated hair and scalp pain. This adjustment has heretofore been attempted by various means. One means to accomplish this is for the user to move a hand held hair dryer further away from the head, thus dissipating to the air some of the heat of the airstream. This increases drying time, is cumbersome and not very satisfactory because, when hair is being dried, it dries unevenly, making it difficult for the user to make the adjustments without suffering overdried hair and scalp pain in at least some areas of the head. Other methods involve the user switching the dryer to lower temperature settings. This too depends upon the user being alerted to the need of lowering temperature by pain sensation and again, the lowering of the overall dryer temperature increases the drying time and makes the operation inefficient.

Since the temperature of the hair being dried is a function of its water content, if one can control the hair temperature, then its humidity and elasticity can be controlled and overdrying and scalp pain can be eliminated or reduced substantially.

One method, as disclosed in deGroot, U.S. Pat. No. 4,167,820, issued Sept. 18, 1979 involves placing a temperature probe in the hair. The probe is wire connected to a regulating element which is also connected to a heating element. This is somewhat inconvenient in a hand-held dryer since the probe has to be moved as the hair dryer is moved and the wires connecting the probe to the regulator can be troublesome. For a stationary dryer such as used in salons a multitude of probes in the hair would be required.

Other types of sensors depend on determining the temperature of the air as it reflects off the head into a return duct. This concept operates satisfactorily but is of limited range.

There is therefore a need for an accurate automatic temperature sensing and adjusting means of a hair dryer which is not limited by range, is convenient to use and avoids overdrying the hair and heating the scalp until pain results.

BRIEF SUMMARY OF THE INVENTION

The present invention provides a hair dryer having an infrared sensor system which picks up infrared radiation from the hair being dried by means of a radiometric detector system which is part of the dryer. The detector system is aimed at the area on the hair where the airstream from the dryer is directed. The detector system has a mirror for picking up and reflecting the infrared radiation from the hair through a spectrally selective window to a pyroelectric sensor in the focal plane of the mirror. The sensor is connected to controlling means which control the output of the hair dryer heater and thus the temperature of the hair. The controlling means can be selectively adjusted so that as the hair dries and the temperature of the hair fibers in the target area rises to a point at which the hair contains a predetermined amount of moisture, the heat output of the heating element is automatically reduced. This permits the most efficient drying and prevents overdrying of the hair and pain sensation in the scalp. In usual circumstances, when the temperature of the scalp reaches 50° C., pain is felt. The control means will prevent this temperature from being exceeded.

In order to reach maximum efficiency in an exemplar of this invention, the temperature sensor permits the detector system to read the temperature of a target area of, for example, about 0.3×0.8 inches on the head when the dryer is held about six inches from the head. Hair dryers can be designed so the target area is of another size and the dryer can be effective if held at a different distance from the head.

There are various known radiometric infrared sensing devices which can be used. These radiometric sensors can be a pyroelectric thermal detector which when operated on AC radiometry requires a chopper, or a DC radiometer which does not require mechanical chopping of the incoming radiation.

Thermopiles can be used with DC radiometers. Pyroelectric detectors are most suitable in AC radiometry and involve radiation that is interrupted (chopped) at a prescribed rate.

The preferred embodiment is the pyroelectric detector since it has the highest sensitivity and responsivity.

BRIEF DESCRIPTION OF THE DRAWINGS

FIG. 1 is a schematic illustration of this invention.

DETAILED DESCRIPTION OF THE INVENTION

Referring to FIG. 1, the hair dryer 1 comprises a housing 2 having an air inlet 3, an air outlet 4 and may have a handle 5. The handle 5 is shown as used on some hand held hair dryers. The housing 2 is generally tubular shaped on portable dryers, with a handle 5 intermediate the air inlet 3 and the air outlet 4. The handle 5 can be integral with the housing 2 or attached thereto by means known in the art.

A radiometric detector system housing 6 is attached, either by being molded as a part thereof or by suitable screws, on the external surface of the dryer housing 2 near the air outlet end. The radiometric detector system housing 6 contains an infrared temperature sensing system (radiometer) 7. This is for illustration of a preferred embodiment. The radiometer can also be inside the housing.

Inside the dryer housing 2, a heating coil 8 is disposed between a fan 9 and the air outlet 4. A fan motor 10 is disposed to the rear of the fan 9, between the air inlet 3 and the fan 9. The fan motor 10 is electrically connected to DC power supply 22A. The wires 11 are electrically connected to the heating coil 8 and the radiometer 7 through a gate-controlled semiconductor switch 21 which controls the power going to the heating coil 8. Other suitable known switches can be used for controlling the power going to the heating coil.

The fan 9 causes air to be blown over the heating coil 8 and out the air outlet 4.

The detector system housing 6 has an opening 12 in the front portion to admit infrared radiation from the hair being dried. A filter 13 which passes infrared radiation approximately in the wavelength range of 6 to 20 microns is in the front of a sensor 14 i.e. between a spherical mirror 15 and sensor 14 which is in the focal plane of the spherical mirror 15 in the rear portion of the detector system housing 6. Suitable filters are e.g. germanium or silicon, with germanium preferred, however, other suitable long wavelength passing filters can also be used. The sensor 14 which is fixedly attached to the inner side of the detector housing 6 toward the front is preferably a pyroelectric thermal sensor 14 made up of two vertical strips of elements of opposite polarity set side by side. A two stage cascade Field Effect Transistor (FET) amplifier can be part of the sensor 14 to amplify the signal from the sensor 14. The spherical mirror 15 which is attached to the detector system housing 6 in the rear portion thereof has an aluminized first surface which reflects incoming infrared radiation through the filter 13 to the sensor 14. The diameter of the mirror 15 is about 40 mm and its focal length is about 37 mm. The detector dimensions were chosen to provide a field of view of about 0.3 inches × 0.8 inches at a range of 6 inches. The mirror 15 is adjusted so that its field of view is the same site as the target area of the airstream from the dryer.

A chopper 16 which alternately allows one or the other of the sensors 14 to receive the infrared radiation reflected off the mirror 15 is placed in the detector system housing 6 between the mirror 15 and sensor elements 14. The chopper 16 interrupts the radiation directed toward the sensor 14 by a rapid vibrating back and forth movement within the path of the reflected radiation. It is, of course, apparent that the mechanical chopper can be replaced by electronic switching means or the fan motor can be used to create the interruption.

The temperature of the chopper does not affect the temperature readings, it is only the output of the sensor elements 14 which activate the control units which are on a circuit board 17 situated behind the mirror 15 in the detector system housing 6. The circuit board 17 contains AC amplifiers 18 which amplify the previously amplified signal from the sensors 14 and restrict the band width of signals from the sensor 14 to a narrow range centered at the chopper frequency, e.g. about 10 hertz; a diode half wave voltage doubling rectifier 19 which converts the AC signal from the amplifier 18 to DC; and a zero crossing switch 20 which, in response to the signal from the diode 19, activates a switch 21, e.g., a Triac, which is electrically connected to the heating coil 8. A power supply, consisting of a transformer 22 and DC supply 22A is used to feed the electronics. Also on the circuit board 17 is potentiometer 23 selected to adjust the sensitivity of the radiometer 7 to set the control point to a particular target temperature at which the heating coil 8 is turned off or controlled. The heat reflected from hair which is adequately dried but not high enough to cause scalp pain is about 50° C. Thus, the potentiometer 23 is set so that radiometer 7 turns off the heating coil 8 when the infrared radiation indicates the hair being dried is at a temperature of about 50° C. or it can maintain the heating coil 8 output so the temperature remains at about 50° C. If high hair humidity is desirable, potentiometer 23 can be adjusted to a lower set point.

Three wires emerge from the circuit board 17, one is connected to the heating coil 8, and two from the transformer 22 and thence to the DC supply 22A which provides low voltage DC to the electronics and power to the fan motor 10.

An on-off switch 24 is on the handle 5 and is electrically connected to the wires 11.

As is apparent from the above, this invention provides a hair dryer incorporating a remote infrared sensing device which can detect the infrared radiation emanating from hair as it is being dried, and thus its temperature. The infrared sensing device has electrical means which react to the electrical impulses transmitted by the sensor as a result of infrared radiation picked up and control the amount of electrical current which passes through the resistance heating coil in the dryer, thus, controlling the temperature of the air blown onto the hair being dried. This invention is not intended to be limited to the specific infrared sensor and heating coil control mechanisms since other equally operable known devices will achieve essentially the same results. Additionally, the dryer can be hand-held, portable or stationary. In a stationary dryer, more than one sensor would be needed.

In operation, the hair dryer of this invention operates as follows: The on-off switch 24 is turned on allowing electric power to be transmitted to the fan motor 10, the heater 8 and the radiometer 7. The fan 9 draws air into the air inlet 3 and blows it over the heating coil 8 where it is heated and thence out the air outlet 4 onto the hair to be dried. Infrared radiation from the hair being dried is picked up by the mirror 15 in the detector system housing 6 and reflected onto the sensors 14 through a filter 13. The filter 13 allows only infrared radiation of about 6 to 20 microns to pass. The sensor 14 has two sensing elements, and a chopper 16 allows passage of the radiation reflected from the mirror 15 alternately to each element. The sensor 14 converts the radiation to electric signals and transmits it via wires to a circuit board 17 and through the following, an amplifier 18, a diode half wave voltage doubling rectifier 19, a zero crossing switch 20 which activates a switch 21, preferably a gate-controlled semiconductor switch, that transmits the signal to the heating coil 8. The sensitivity of the sensing mechanism can be adjusted with the potentiometer 23, which can also be on the circuit board 17, so that when the infrared radiation sensed indicates a preset temperature of the hair, e.g., about 50° C., the switch 21 regulates the power so the heating coil 8 is regulated.

We claim:

1. An electric hair dryer comprising a housing having therein an air inlet,
an air outlet,
a heating source comprising a fan and heating means,
at least one infrared radiation detector to sense the infrared radiation emanating from the hair and to convert said infrared radiation to electric signals,
wherein said electric signals are transmitted to control means for controlling the output of the heating means in response to the infrared radiation electric signals to permit rapid drying without the hair exceeding a predetermined temperature level.

2. The hair dryer of claim 1 wherein the field of view of said infrared radiation detector covers the same area as the target area of the hair dryer airstream.

3. The hair dryer of claim 1 wherein potentiometer means are electrically connected to said control means for adjusting the sensitivity of said control means to any predetermined temperature level.

4. The hair dryer of claim 1 wherein the infrared radiation detector is a radiometer.

5. The hair dryer of claim 4 wherein the radiometer comprises a thermal sensor, a reflecting mirror and an infrared radiation filter means.

6. The hair dryer of claim 5 wherein filtering means passes only infrared radiation in the wavelength range of about 6 to 20 microns.

7. The electric hair dryer of claim 5 wherein the thermal sensor is a pyroelectric thermal sensor.

8. The hair dryer of claim 5 wherein the control means is a semi-conductor switch controlled by the output of the radiometer.

9. An electric hand-held hair dryer comprising a housing with an air inlet, air outlet and handle, and having therein a heating source comprising a fan and a heating means, said housing having a remote sensing infrared radiation detector aimed at the site on the head where the hair is being dried to sense the infrared radiation emanating therefrom and to convert said infrared radiation to electric signals, wherein said electric signals are transmitted to control means electrically connected to the heating means for controlling the output of the heating means in response to said infrared radiation to prevent the temperature at said site on the head from exceeding a predetermined level, and having potentiometer means electrically connected to the control means for adjusting the sensitivity to any predetermined temperature.

10. The hair dryer of claim 9 wherein the infrared detector means is a radiometer with a pyroelectric sensor, a reflecting mirror and an infrared radiation filter means which passes only infrared radiation in the wavelength range of about 6 to 20 microns.

* * * * *